US009167440B2

(12) United States Patent
Kim et al.

(10) Patent No.: US 9,167,440 B2
(45) Date of Patent: Oct. 20, 2015

(54) MOBILE TERMINAL DEVICE FOR POSITIONING SYSTEM BASED ON MAGNETIC FIELD MAP AND METHOD THEREOF

(71) Applicant: Samsung Electronics Co., Ltd., Suwon-si (KR)

(72) Inventors: Yong Kim, Seoul (KR); Eung Sun Kim, Suwon-si (KR); Ji Hyun Yoon, Changwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 62 days.

(21) Appl. No.: 13/681,505

(22) Filed: Nov. 20, 2012

(65) Prior Publication Data
US 2013/0150076 A1 Jun. 13, 2013

(30) Foreign Application Priority Data

Dec. 7, 2011 (KR) .................. 10-2011-0130398

(51) Int. Cl.
*H04W 24/00* (2009.01)
*G01V 3/08* (2006.01)
(Continued)

(52) U.S. Cl.
CPC .............. *H04W 24/00* (2013.01); *G01C 21/165* (2013.01); *G01C 21/206* (2013.01); *G01V 3/08* (2013.01); *G01S 5/0252* (2013.01)

(58) Field of Classification Search
CPC .... G01C 21/16; G01C 21/165; G01C 21/005; G01C 21/20; G01C 21/206; G01C 19/00; G01C 25/005; G01C 19/02; G01C 21/30; G01S 19/49; G01S 17/023; G08B 25/016; G08G 1/20; A61B 2562/0219; G06F 3/0346; H04W 24/00; G01V 3/08

USPC ............................ 455/456.1–456.3; 370/338
See application file for complete search history.

(56) References Cited

U.S. PATENT DOCUMENTS 2,888,752 A 6/1959 Lawson
6,014,103 A 1/2000 Sumner et al.
(Continued)

FOREIGN PATENT DOCUMENTS

EP 0 069 965 A1 1/1983
EP 0 485 132 A2 5/1992
(Continued)

OTHER PUBLICATIONS

Haverinen et al. "Global indoor sel-localization based on the ambient magnetic field." Robotics and Autonomous Systems vol. 57 No. 10 (2009): 1028-1035.
(Continued)

*Primary Examiner* — Marcos Batista
(74) *Attorney, Agent, or Firm* — NSIP Law

(57) ABSTRACT

A mobile terminal device for a positioning system based on a magnetic field map and a method thereof, are provided. The mobile terminal includes a memory configured to store a magnetic field map including magnetic field values at positions. The mobile terminal further includes a magnetic field sensor configured to measure a magnetic field value at a position of the mobile terminal. The mobile terminal further includes an inertial measurement unit (IMU) sensor configured to measure an acceleration value and a gyro value of the mobile terminal. The mobile terminal further includes a processor configured to determine the position of the mobile terminal based on the magnetic field map, the magnetic field value, the acceleration value, and the gyro value.

18 Claims, 5 Drawing Sheets

(51) Int. Cl.
*G01C 21/16* (2006.01)
*G01C 21/20* (2006.01)
*G01S 5/02* (2010.01)

(56) References Cited

U.S. PATENT DOCUMENTS

| | | |
|---|---|---|
| 2007/0150195 A1 | 6/2007 | Koskan et al. |
| 2008/0077326 A1* | 3/2008 | Funk et al. .................. 701/220 |
| 2009/0204323 A1 | 8/2009 | Huddle |
| 2009/0254276 A1 | 10/2009 | Faulkner et al. |
| 2009/0276155 A1 | 11/2009 | Jeerage et al. |
| 2010/0082238 A1* | 4/2010 | Nakamura et al. ........... 701/208 |
| 2010/0109950 A1 | 5/2010 | Roh |
| 2010/0277163 A1* | 11/2010 | Nakamura et al. ............ 324/228 |
| 2010/0324862 A1 | 12/2010 | Sato et al. |
| 2011/0055746 A1* | 3/2011 | Mantovani et al. ........... 715/771 |
| 2012/0072167 A1* | 3/2012 | Cretella et al. ................ 702/150 |

FOREIGN PATENT DOCUMENTS

| | | |
|---|---|---|
| EP | 1 530 024 A1 | 5/2005 |
| KR | 10-2010-0127343 A | 12/2010 |
| KR | 10-2011-0056185 A | 5/2011 |

OTHER PUBLICATIONS

Extended Europena Search Report issued on Apr. 2, 2013 in counterpart European Application No. 12191402.2 (8 pages in English).

* cited by examiner

MOBILE TERMINAL DEVICE FOR POSITIONING SYSTEM BASED ON MAGNETIC FIELD MAP AND METHOD THEREOF

CROSS-REFERENCE TO RELATED APPLICATION(S)

This application claims the benefit under 35 U.S.C. §119 (a) of Korean Patent Application No. 10-2011-0130398, filed on Dec. 7, 2011, in the Korean Intellectual Property Office, the entire disclosure of which is incorporated herein by reference for all purposes.

BACKGROUND

1. Field

The following description relates to a mobile terminal device for a positioning system based on a magnetic field map and a method thereof.

2. Description of Related Art

A mobile communication signal-based positioning method may approximate a position of a terminal based on a position of a cell base station connected to the terminal and on a proximity scheme, or based on triangulation measuring a travel distance of a signal between the terminal and at least three cell base stations near the terminal. A wireless LAN-based positioning method may approximate a position of a wireless LAN terminal based on a position of an access point (AP) that the terminal belongs to, or based on a strength of a signal at an AP near the terminal to perform pattern matching through use of a fingerprint recorded in advance. An ultra-wide band (UWB)-based positioning method may approximate a position of a terminal based on triangulation measuring a distance between the terminal and an AP that generates a UWB signal.

A magnetic field map-based positioning method may approximate a position of a terminal based on a magnetic field at the position of the terminal. In this example, representative positioning methods may include a Kalman filter, a particle filter, Markov localization, and other types of methods. The methods may measure environmental parameters varying, in several forms, as a mobile terminal moves, and may estimate a position of the mobile terminal based on the result of the measurement.

SUMMARY

In one general aspect, there is provided a mobile terminal for a magnetic field map-based positioning system, including a memory configured to store a magnetic field map including magnetic field values at positions. The mobile terminal further includes a magnetic field sensor configured to measure a magnetic field value at a position of the mobile terminal. The mobile terminal further includes an inertial measurement unit (IMU) sensor configured to measure an acceleration value and a gyro value of the mobile terminal. The mobile terminal further includes a processor configured to determine the position of the mobile terminal based on the magnetic field map, the magnetic field value, the acceleration value, and the gyro value.

The gyro value includes a rotation value and an orientation value of the mobile terminal.

The processor includes a magnetic field value corrector configured to correct the magnetic field value based on the acceleration value and the gyro value. The process further includes a first position estimator configured to determine the position of the mobile terminal based on the magnetic field map and the corrected magnetic field value.

The magnetic field value corrector includes a tilt error calculator configured to determine a tilt error of the mobile terminal based on the acceleration value and the gyro value. The magnetic field value corrector further includes a magnetic field value correction implementer configured to correct the magnetic field value based on the tilt error.

The tilt error includes a pitch, a roll, and a yaw of the mobile terminal.

The processor includes a first direction information generator configured to generate first direction information based on the magnetic field value and the acceleration value. The processor further includes a second direction information generator configured to generate second direction information based on the acceleration value and the gyro value. The processor further includes a direction information weight setting unit configured to set a direction information weight based on the first direction information and the second direction information.

The direction information weight setting unit is further configured to subtract a variance of the second direction information from a variance of the first direction information to determine a first value. The direction information weight setting unit is further configured to set the direction information weight to the second direction information if the first value is greater than a predetermined threshold value. The direction information weight setting unit is further configured to subtract the variance of the first direction information from the variance of the second direction information to determine a second value. The direction information weight setting unit is further configured to set the direction information weight to the first direction information if the second value is greater than the predetermined threshold value.

The processor further includes a travel distance calculator configured to determine a travel distance of the mobile terminal based on the acceleration value. The processor further includes a second position estimator configured to determine the position of the mobile terminal based on the magnetic field map, the magnetic field value, the direction information weight, and the travel distance.

The processor includes a magnetic field value corrector configured to correct the magnetic field value based on the acceleration value and the gyro value. The processor further includes a direction information generator configured to set direction information weight of the mobile terminal based on the corrected magnetic field value, the acceleration value, and the gyro value. The processor further includes a travel distance calculator configured to determine a travel distance of the mobile terminal based on the acceleration value. The processor further includes a third position estimator configured to determine the position of the mobile terminal based on the magnetic field map, the corrected magnetic field value, the direction information weight, and the travel distance.

The processor is further configured to determine the position of the mobile terminal based on a particle filter, or a Kalman filter, or Markov localization, or any combination thereof.

In another general aspect, there is provided a positioning method for a magnetic field map-based positioning system, including determining a magnetic field map including magnetic field values at positions. The method further includes measuring a magnetic field value at a position of a mobile terminal. The method further includes measuring an acceleration value and a gyro value of the mobile terminal. The method further includes determining the position of the mobile terminal based on the magnetic field map, the magnetic field value, the acceleration value, and the gyro value.

The gyro value includes a rotation value and an orientation value of the mobile terminal.

The determining of the position of the mobile terminal includes correcting the magnetic field value based on the acceleration value and the gyro value. The determining of the position of the mobile terminal further includes determining the position of the mobile terminal based on the magnetic field map and the corrected magnetic field value.

The correcting includes determining a tilt error of the mobile terminal based on the acceleration value and the gyro value. The correcting further includes correcting the magnetic field value based on the tilt error.

The tilt error includes a pitch, a roll, and a yaw of the mobile terminal.

The determining of the position of the mobile terminal includes generating first direction information based on the magnetic field value and the acceleration value. The determining of the position of the mobile terminal further includes generating second direction information based on the acceleration value and the gyro value. The determining of the position of the mobile terminal further includes setting a direction information weight based on the first direction information and the second direction information.

The setting includes subtracting a variance of the second direction information from a variance of the first direction information to determine a first value. The setting further includes setting the direction information weight to the second direction information if the first value is greater than a predetermined threshold value. The setting further includes subtracting the variance of the first direction information from the variance of the second direction information to determine a second value. The setting further includes setting the direction information weight to the first direction information if the second value is greater than the predetermined threshold value.

The determining of the position of the mobile terminal further includes determining a travel distance of the mobile terminal based on the acceleration value. The determining of the position of the mobile terminal further includes determining the position of the mobile terminal based on the magnetic field map, the magnetic field value, the direction information weight, and the travel distance.

The determining of the position of the mobile terminal includes correcting the magnetic field value based on the acceleration value and the gyro value. The determining of the position of the mobile terminal further includes setting direction information weight of the mobile terminal based on the corrected magnetic field value, the acceleration value, and the gyro value. The determining of the position of the mobile terminal further includes determining a travel distance of the mobile terminal based on the acceleration value. The determining of the position of the mobile terminal further includes determining the position of the mobile terminal based on the magnetic field map, the corrected magnetic field value, the direction information weight, and the travel distance.

A non-transitory computer-readable storage medium stores a program including instructions to implement the method.

Other features and aspects may be apparent from the following detailed description, the drawings, and the claims.

Figure 1:
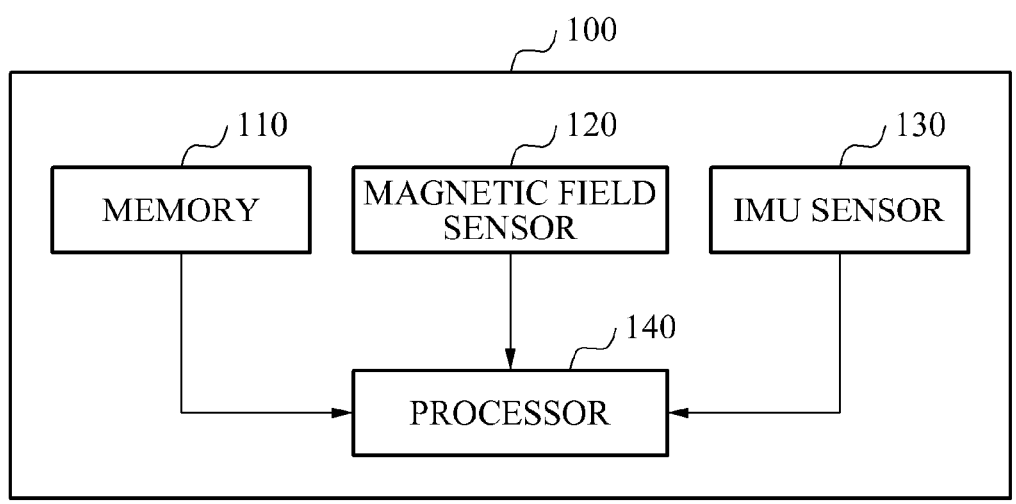
FIG. 1 is a block diagram illustrating an example of a mobile terminal for a magnetic field map-based positioning system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a mobile terminal 100 for a magnetic field map-based positioning system. The mobile terminal 100 includes a memory 110, a magnetic field sensor 120, an inertial measurement unit (IMU) sensor 130, and a processor 140.

The memory 110 stores information associated with a magnetic field map. The magnetic field map includes magnetic field values measured in advance at positions included in a predetermined range of a region, for example, a region for which estimation of a position of the mobile terminal 100 is to be performed.

In this example, the positions may include positions at predetermined intervals, positions allowing a magnetic field value to be measured, and/or positions to which the mobile terminal 100 is able to reach. In addition, the positions may include positions in a three-dimensional (3D) space, as opposed to positions in a two-dimensional (2D) plane. For example, the mobile terminal 100 may be utilized to estimate a position indoors, such as an inside of a high-rise building and other types of buildings. A magnetic field may be measured on each floor of the high-rise building at a fixed position, e.g., the same position when viewed in a 2D planar view. Although the fixed positions appear to be the same in the 2D planar view, the fixed positions include different altitudes in the 3D space. Accordingly, the measured magnetic field values are different from each other.

In addition, the memory 110 may store magnetic field maps corresponding to regions. That is, the memory 110 may store the magnetic field maps to estimate a position in the regions. In this example, each floor of the high-rise building may be included in the regions.

The magnetic field sensor 120 measures a magnetic field value at a position of the mobile terminal 100, and the IMU sensor 130 measures an acceleration value and a gyro value of the mobile terminal 100. In this example, the magnetic field sensor 120 may measure a magnetic field value of each of three axes including an-x axis, a-y axis, and a-z axis that correspond to the position of the mobile terminal 100. The IMU sensor 130 may include three accelerometers to measure acceleration values of the x-axis, the y-axis, and the z-axis, and three gyroscopes to measure gyro values of the x-axis, the y-axis, and the z-axis. As used in herein, the term "gyro values" refers to values of a rotation and an orientation measured by a gyroscope.

The processor 140 compares the magnetic field value measured by the magnetic field sensor 120 and the magnetic field map stored in the memory 110. Based on this comparison, the processor 140 estimates, as the position of the mobile terminal 100, a point including a magnetic field value similar to or the same as the measured magnetic field value, from among points included in the magnetic field map.

When the mobile terminal 100 is tilted while the magnetic field sensor 120 measures the magnetic field value at the position of the mobile terminal 100, the measured magnetic field value includes a tilt error. The tilt error is an error included in the measured magnetic field value due to a tilt of the magnetic field sensor 120. In this example, the tilt error may be expressed by a degree of rotation about each of the three axes. The degree of rotation about each of the three axes may be expressed by a pitch, a roll, and a yaw.

As the mobile terminal 100 is tilted, the magnetic field sensor 120 included in the mobile terminal 100 is correspondingly tilted. In this example, a magnetic field value of each of the x-axis, the y-axis, and the-z axis measured by the tilted magnetic field sensor 120 is different from a magnetic field value of each of the x-axis, the y-axis, and the z-axis measured by a magnetic field sensor that is not tilted. The magnetic field sensor 120 provides the magnetic field value including the tilt error to the processor 140, and the processor 140 estimates the position of the mobile terminal 100 based on the magnetic field value including the tilt error. Accordingly, the processor 140 may inaccurately estimate the position of the mobile terminal 100.

The processor 140 corrects the tilt error of the magnetic field sensor 120 through use of the IMU sensor 130. That is, the processor 140 corrects the tilt error of the magnetic field sensor 120 based on the acceleration value and/or the gyro value measured by the IMU sensor 130, which will be described in detail with reference to FIG. 2.

In further examples, the processor 140 may use, for example, a Kalman filter, a particle filter, Markov localization, and/or other types of methods, as a positioning method of estimating the position of the mobile terminal 100. The positioning method, such as the particle filter, may inaccurately estimate the position when an error occurs in an intermediate result value to be used to estimate the position while the method is being performed. The positioning method, such as the particle filter, may perform a subsequent cycle based on a position estimated based on a previous cycle, and may repeatedly perform the process to estimate a final position.

For example, a drawback of the approach described in the foregoing may occur due to the magnetic field sensor 120 being affected by an external factor. In this example, a magnetic substance that is absent when the magnetic field map is generated may happen to exist near the mobile terminal 100 when the magnetic field sensor 120 measures the magnetic field.

When the magnetic field value measured by the magnetic field sensor 120 is interrupted by an external factor while the position of the mobile terminal 100 is being estimated, there may be an error in the intermediate result value to be used to estimate the position. Accordingly, the position of the mobile terminal 100 estimated by the processor 140 may also include an error.

The processor 140 prevents this error from occurring, through use of the IMU sensor 130. The processor 140 estimates a travel direction and/or a travel distance of the mobile terminal 100, based on the acceleration value and the gyro value measured by the IMU sensor 130, the magnetic field map stored in the memory 110, and the magnetic field value measured by the magnetic field sensor 120. Accordingly, an estimated position is prevented from altered to a point that is different from the real position of the mobile terminal 100 while the positioning method, such as the particle filter, is in operation. A detailed description thereof will be provided with reference to FIG. 3.

Figure 2:
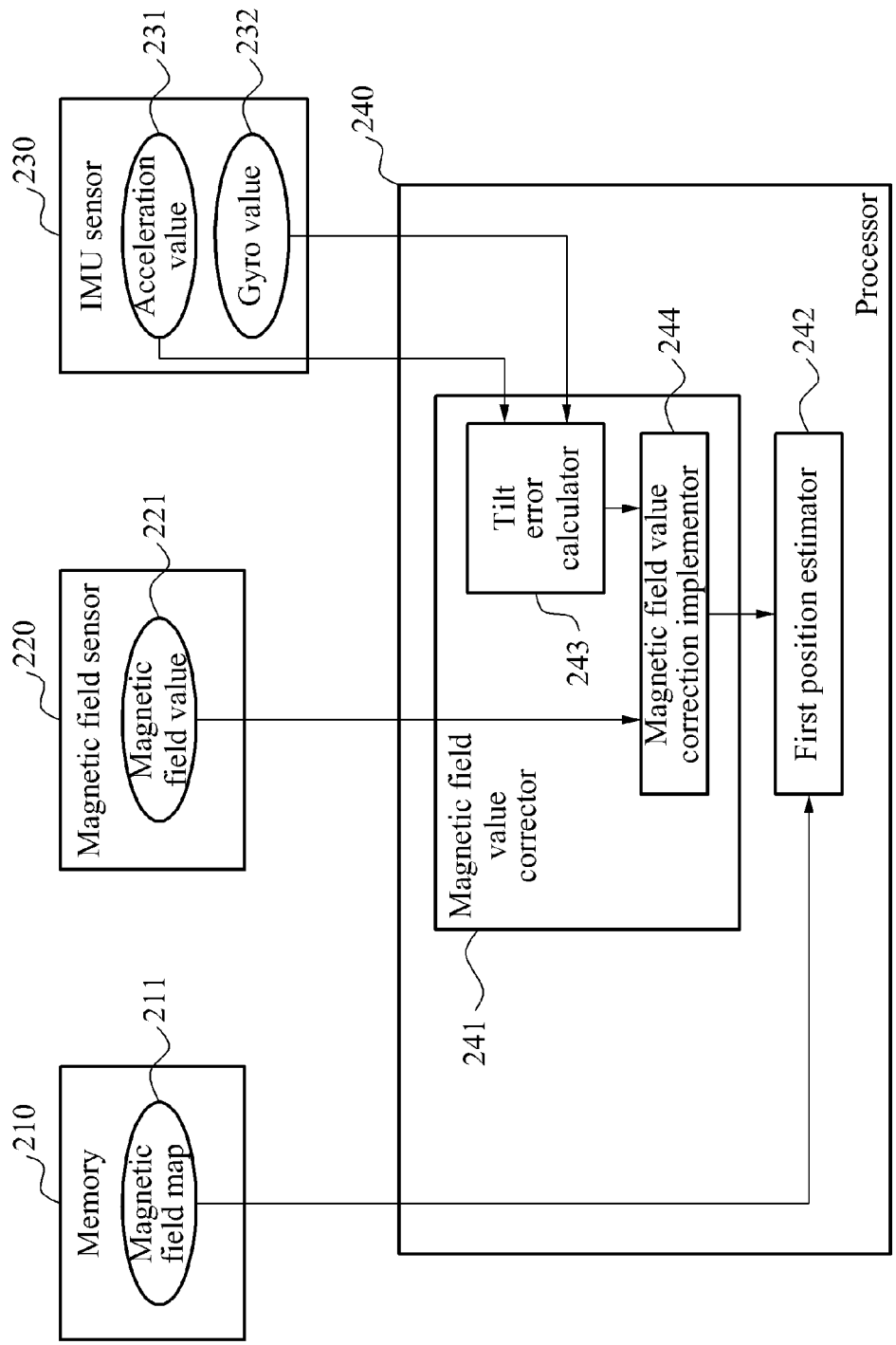
FIG. 2 is a block diagram illustrating an example of a processor estimating a position of a mobile terminal based on a magnetic field value corrected through use of an inertial measurement unit (IMU) sensor.

FIG. 2 illustrates an example of a processor estimating a position of a mobile terminal based on a magnetic field value corrected through use of an IMU sensor. The mobile terminal for a magnetic field map-based positioning system includes a memory 210, a magnetic field sensor 220, an IMU sensor 230, and a processor 240, which may correspond to the memory 110, the magnetic field sensor 120, the IM sensor 130, and the processor 140, respectively, of FIG. 1. The processor 240 performs a positioning method.

In more detail, the processor 240 includes a magnetic field value corrector 241 and a first position estimator 242. The magnetic field value corrector 241 corrects a magnetic field value 221 measured by the magnetic field sensor 220 based on an acceleration value 231 and a gyro value 232 measured by the IMU sensor 230. The magnetic field value corrector 241 includes a tilt error calculator 243 calculating a tilt error of the mobile terminal (e.g., of the magnetic field sensor 220) based on the acceleration value 231 and the gyro value 232. The magnetic field value corrector 241 further includes a magnetic field value correction implementer 244 implementing a correction of the measured magnetic field value 221 based on the calculated tilt error.

For example, the magnetic field sensor 220 measures the magnetic field value 221 at each of an x-axis, a y-axis, and a z-axis that correspond to the position of the mobile terminal, and magnetic field values measured at the three axes may be denoted by $m_x$, $m_y$, and $m_z$, respectively. The IMU sensor 230 measures the acceleration value 231 and the gyro value 232 at each of the x-axis, the y-axis, and the z-axis. Acceleration values measured at the three axes may be denoted by $\alpha_x$, $\alpha_y$, and $\alpha_z$, respectively, and gyro values measured at the three axes may be denoted by $\omega_x$, $\omega_y$, and $\omega_z$, respectively.

In this example, the tilt error of the magnetic field sensor 220 may be expressed by a pitch θ, a roll φ, and a yaw ψ of the mobile terminal. The tilt error calculator 243 may calculate the pitch θ and the roll φ of the mobile terminal based on Equation 1 and Equation 2, respectively.

$$\theta = \sin^{-1}\left(\frac{a_x}{g}\right) \quad \text{[Equation 1]}$$

-continued $$\phi = \sin^{-1}\left(\frac{a_y}{g\cos\theta}\right) \quad \text{[Equation 2]}$$

In Equations 1 and 2, g denotes standard gravity.

In addition, the tilt error calculator 243 may calculate the yaw ψ of the mobile terminal, by substituting the pitch θ, the roll φ, and the gyro values $\omega_x$, $\omega_y$, and $\omega_z$ into a differential equation to calculate an orientation expressed by Equation 3.

$$\begin{bmatrix} \dot{\phi} \\ \dot{\theta} \\ \dot{\psi} \end{bmatrix} = \begin{bmatrix} 1 & \sin\phi\tan\theta & \cos\phi\tan\theta \\ 0 & \cos\phi & -\sin\phi \\ 0 & \sin\phi\sec\theta & \cos\phi\sec\theta \end{bmatrix} \begin{bmatrix} \omega_x \\ \omega_y \\ \omega_z \end{bmatrix} \quad \text{[Equation 3]}$$

In Equation 3, the processor 240 may set, as the yaw ψ of the mobile terminal, a third result value from among result values of the differential equation.

The magnetic field value correction implementer 244 calibrates the measured magnetic field value 221 based on the calculated tilt error, to correct the measured magnetic field value 221.

The first position estimator 242 estimates the position of the mobile terminal based on the corrected magnetic field value and a magnetic field map 211 stored in the memory 210. In more detail, the first position estimator 242 compares the corrected magnetic field value with magnetic field values included in the magnetic field map 211. Based on this comparison, the first position estimator 242 estimates, as the position of the mobile terminal, a point including a magnetic field value similar to or the same as the corrected magnetic field value, from among points included in the magnetic field map. Accordingly, a reliability of the positioning method estimating the position of the mobile terminal is improved.

Figure 3:
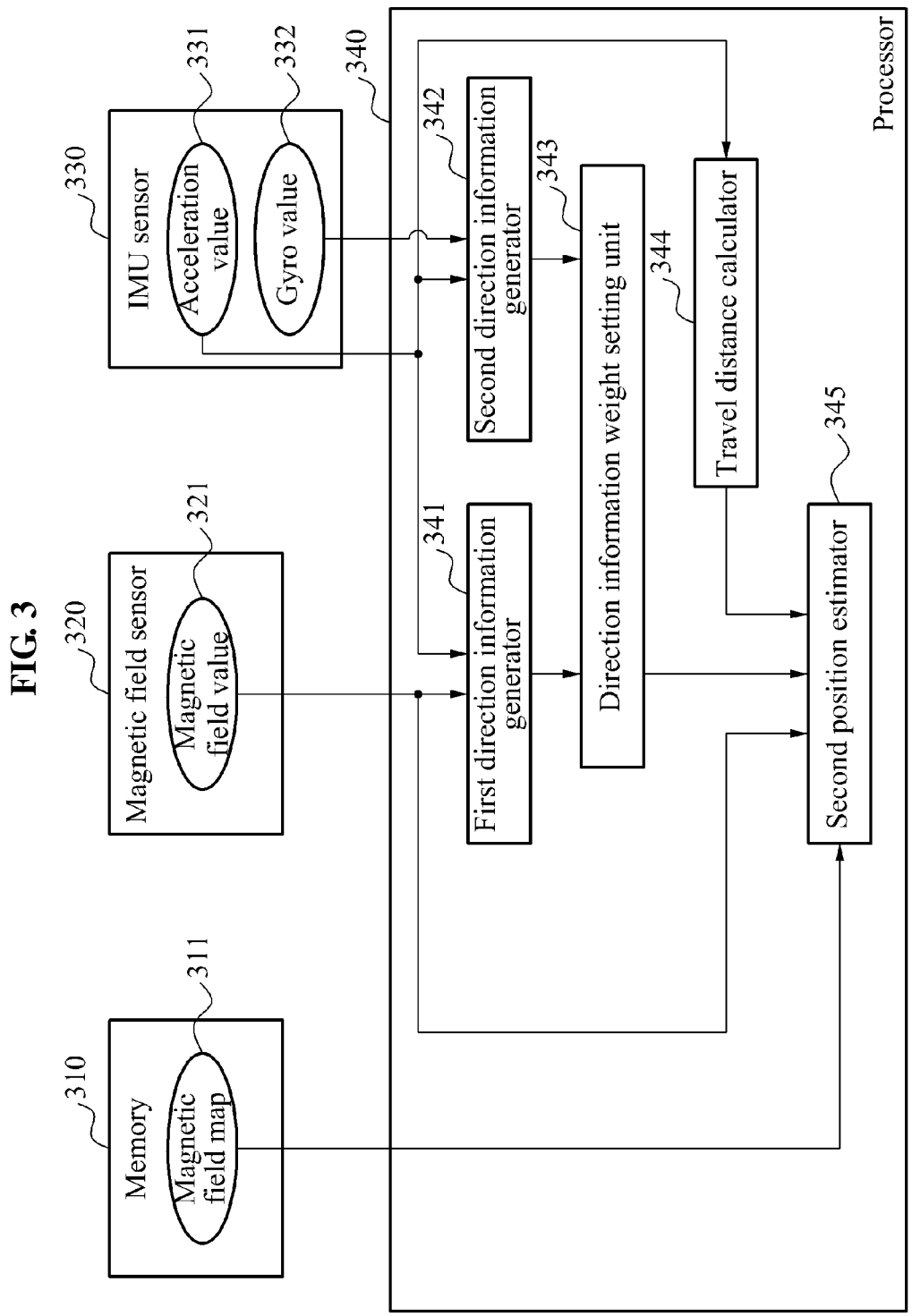
FIG. 3 is a block diagram illustrating an example of a processor estimating a position of a mobile terminal based on direction information and travel distance information estimated through use of an IMU sensor.

FIG. 3 illustrates an example of a processor estimating a position of a mobile terminal based on direction information and travel distance information estimated through use of an IMU sensor. The mobile terminal for a magnetic field map-based positioning system includes a memory 310, a magnetic field sensor 320, an IMU sensor 330, and a processor 340, which may correspond to the memory 110, the magnetic field sensor 120, the IM sensor 130, and the processor 140, respectively, of FIG. 1. The processor 340 performs a positioning method.

In more detail, the processor 340 includes a first direction information generator 341, a second direction information generator 342, a direction information weight setting unit 343, a travel distance calculator 344, and a second position estimator 345. The first direction information generator 341 generates first direction information of the mobile terminal based on a magnetic field value 321 measured by the magnetic field sensor 320 and an acceleration value 331 measured by the IMU sensor 330.

For example, the first direction information generator 341 may generate the first direction information ψ based on Equation 4.

$$\psi = \tan^{-1}\left(\frac{Y_{fg}\cos\phi - Z_{fg}\sin\phi}{X_{fg}\cos\theta - Y_{fg}\sin\theta\sin\phi - Z_{fg}\sin\theta\sin\phi}\right) \quad \text{[Equation 4]}$$

In Equation 4, a pitch θ and a roll φ of the mobile terminal may be calculated by substituting the measured acceleration value 331 into Equations 1 2, respectively. $X_{fg}$, $Y_{fg}$, and $Z_{fg}$ may correspond to the magnetic field values $m_x$, $m_y$, and $m_z$, which are measured at the x-axis, the y-axis, and the z-axis, respectively, e.g., of the magnetic field value 321.

The second direction information generator 342 generates second direction information of the mobile terminal based on the acceleration value 331 and a gyro value 332 measured by the IMU sensor 330. For example, the second direction information generator 342 may generate the second direction information of the mobile terminal by integrating the measured gyro value 332. The measured gyro value 332 represents, in terms of physics, an angular acceleration component of the mobile terminal. Thus, it is apparent to one skilled in the art that the second direction information (e.g., a variance of an angle of the mobile terminal) may be obtained by integrating the measured gyro value 332 two times with respect to a time. In another example, the second direction information generator 342 may calculate an instantaneous angular acceleration component of the mobile terminal by integrating the measured gyro value 332 once with respect to a time. The second direction information generator 342 may then multiply the calculated instantaneous angular acceleration component by the time to obtain the second direction information of the mobile terminal. In another example, the second direction information generator 342 may generate the second direction information in the same manner that the tilt error calculator 243 of FIG. 2 calculates the yaw ψ of the mobile terminal.

The direction information weight setting unit 343 sets a direction information weight of the mobile terminal based on the first direction information and the second direction information. The direction information weight setting unit 343 sets the direction information weight to the second direction information when a value obtained by subtracting a variance of the second direction information from a variance of the first direction information is greater than a predetermined threshold value. The direction information weight setting unit 343 sets the direction information weight to the first direction information when a value obtained by subtracting the variance of the first direction information from the variance of the second direction information is greater than the predetermined threshold value. That is, the direction information weight setting unit 343 sets the direction information weight by weighting direction information including a smaller variance than previously-estimated first direction information or second direction information, from among the currently-estimated first direction information and the second direction information estimated based on different factors.

For example, the first direction information uses the magnetic field value 321, and thus, may be sensitive to interference from an external magnetic substance. The second direction information may integrate the measured gyro value 332, and thus, may be sensitive to a temporal component. Accordingly, the direction information weight setting unit 343 may independently calculate the first direction information and the second direction information sensitive to different external factors. The direction information weight setting unit 343 may then determine direction information including a smaller variance than previously-estimated direction information, from among the currently-estimated first direction information and the second direction information, as more reliable direction information. The direction information weight setting unit 343 may apply a weight to the reliable direction information to generate more accurate direction information. In this example, the external factors include the external magnetic substance for the first direction information, and the temporal component for the second direction information.

The travel distance calculator 344 calculates a travel distance of the mobile terminal based on the measured acceleration value 331. For example travel distance calculator 344 may integrate, twice, the measured acceleration value 331 with respect to a time, to calculate the travel distance. In another example, the travel distance calculator 344 may integrate, once, the measured acceleration value 331 with respect to a time to calculate an instantaneous velocity component, and may multiply the calculated instantaneous velocity component by the time to calculate the travel distance.

The second position estimator 345 estimates the position of the mobile terminal based on a magnetic field map 311 stored in a memory 310, the measured magnetic field value 321, the direction information weight, and the travel distance. That is, the second position estimator 345 sets a range of a region in which the mobile terminal is likely to be located based on the direction information weight and the travel distance.

For example, if the measured magnetic field value 321 is affected by an external magnetic substance, the second position estimator 345 may estimate, to be the position of the mobile terminal, a point that is completely different from a real position of the mobile terminal, according to a positioning method comparing the measured magnetic field value 321 with the magnetic field map 311. In this example, the second position estimator 345 may exclude an estimated position value exceeding the range of the region in which the mobile terminal is likely to be located. In this manner, the second position estimator 345 may prevent an estimated position from being altered to a wrong position due to an external interference, such as, for example, a magnetic substance.

Figure 4:
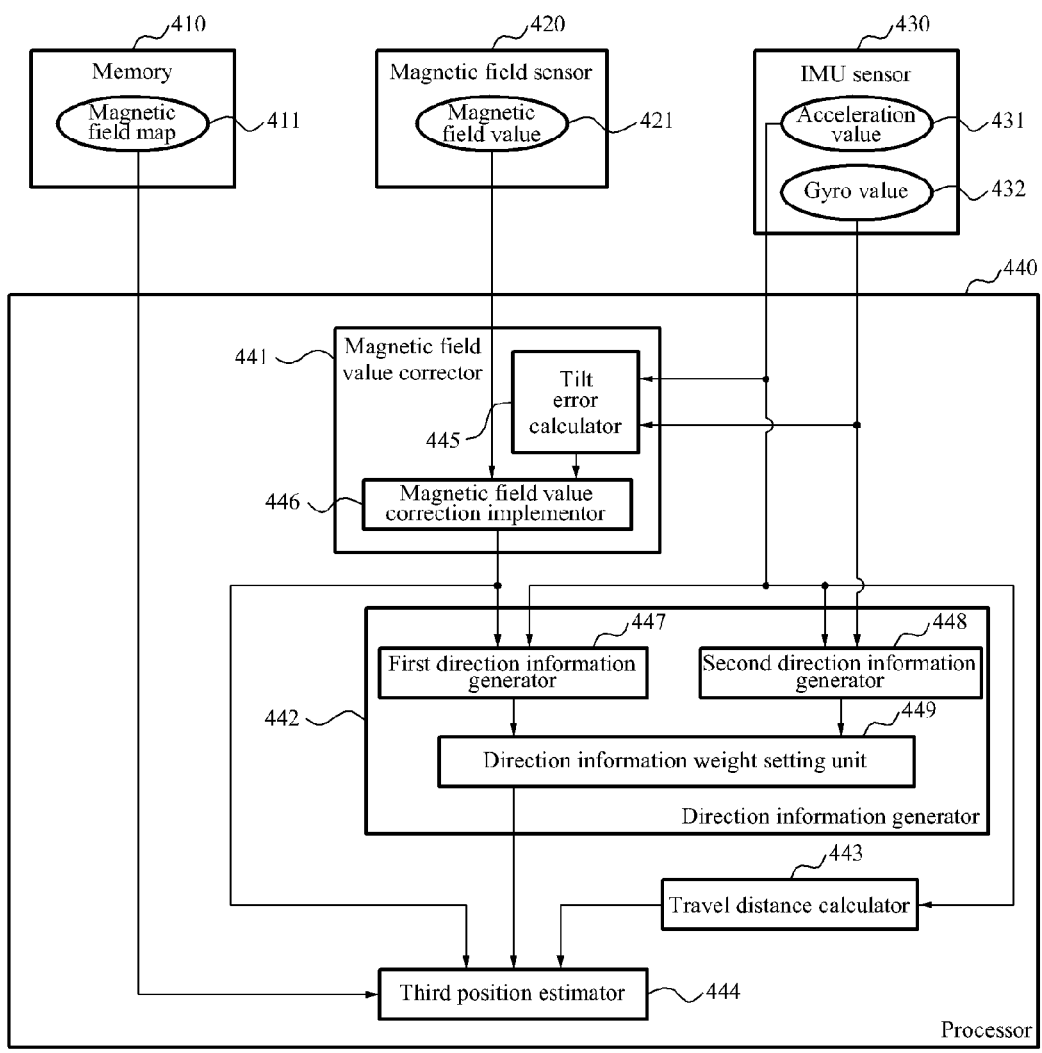
FIG. 4 is a block diagram illustrating an example of a processor estimating a position of a mobile terminal based on a magnetic field value corrected through use of an IMU sensor, and direction information and travel distance information estimated through use of the IMU sensor.

FIG. 4 is illustrates an example of a processor estimating a position of a mobile terminal based on a magnetic field value corrected through use of an IMU sensor, and direction information and travel distance information estimated through use of the IMU sensor. The mobile terminal for a magnetic field map-based positioning system includes a memory 410, a magnetic field sensor 420, an IMU sensor 430, and a processor 440, which may correspond to the memory 110, the magnetic field sensor 120, the IM sensor 130, and the processor 140, respectively, of FIG. 1. The processor 440 performs a positioning method. The processor 440 improves a reliability of the estimated position of the mobile terminal through use of the magnetic field value of which a tilt error is corrected as described in FIG. 2, and a direction information weight and a travel distance as described in FIG. 3.

In more detail, the processor 440 includes a magnetic field value corrector 441, a direction information generator 442, a travel distance calculator 443, and a third position estimator 444. The magnetic field value corrector 441 corrects a magnetic field value 421 measured by a magnetic field sensor 420 based on an acceleration value 431 and a gyro value 432 measured by an IMU sensor 430.

The magnetic field value corrector 441 includes a tilt error calculator 445 and a magnetic field value correction implementer 446. The tilt error calculator 445 calculates the tilt error of the mobile terminal based on the gyro value 432 and the acceleration value 431. The magnetic field value correction implementer 446 implements a correction on the measured magnetic field value 421 based on the calculated tilt error.

The direction information generator 442 includes a first direction information generator 447, a second direction information generator 448, and a direction information weight setting unit 449. The first direction information generator 447 generates first direction information of the mobile terminal based on the corrected magnetic field value 421 corrected by the magnetic field value corrector 441, and the acceleration value 431. The second direction information generator 448 generates second direction information of the mobile terminal based on the acceleration value 431 and the gyro value 432 measured by the IMU sensor 430. The direction information weight setting unit 449 sets a direction information weight of the mobile terminal based on the first direction information and the second direction information.

The travel distance calculator 443 calculates a travel distance of the mobile terminal based on the acceleration value 431. The third position estimator 444 estimates the position of the mobile terminal based on a magnetic field map 411 stored in a memory 410, the corrected magnetic field value 421 corrected by the magnetic field value corrector 441, the direction information weight, and the travel distance. The examples described in the foregoing with reference to FIGS. 1 through 3 may be applicable to the elements of FIG. 4, and thus, detailed descriptions thereof will be omitted.

Figure 5:
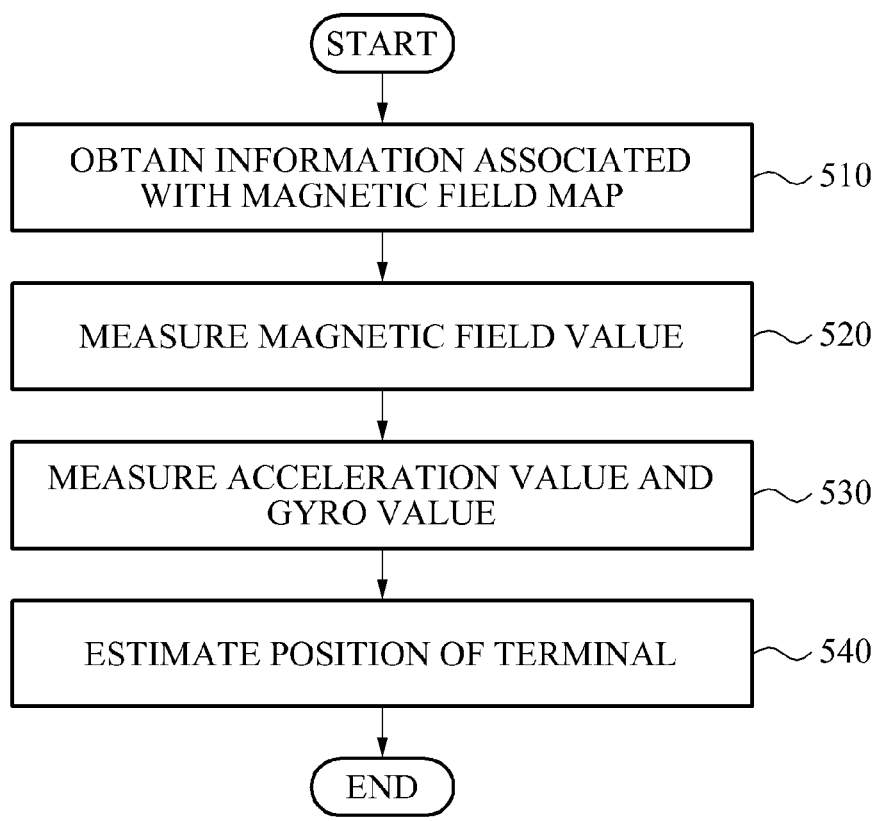
FIG. 5 is a flowchart illustrating an example of a positioning method used by a magnetic field map-based positioning system.

FIG. 5 illustrates an example of a positioning method used by a magnetic field map-based positioning system. In operation 510, the positioning system obtains information associated with a magnetic field map corresponding to a target region of the positioning system. In operation 520, the positioning system measures a magnetic field value at a position of at least one terminal included in the target region. In operation 530, the positioning system measures an acceleration value and a gyro value of the terminal. In operation 540, the positioning system estimates the position of the terminal based on the magnetic field map, the magnetic field value, the acceleration value, and the gyro value.

For example, the estimating of the position of the terminal in operation 540 may include calculating a tilt error of the terminal based on the acceleration value and the gyro value, correcting the magnetic field value based on the tilt error, and estimating the position of the terminal based on the magnetic field map and the corrected magnetic field value. In another example, the estimating the position of the terminal in operation 540 may include generating first direction information based on the magnetic field value and the acceleration value, generating second direction information based on the acceleration value and the gyro value, and setting a direction information weight based on the first direction information and the second direction information. In this example, the estimating the position of the terminal may further include calculating a travel distance of the based on the acceleration value, and estimating the position of the terminal based on the magnetic field map, the magnetic field value, the direction information weight, and the travel distance.

In still another example, the estimating of the position of the terminal in operation 540 may include correcting the magnetic field value based on the acceleration value and the gyro value, and generating direction information weight of the terminal based on the acceleration value, the gyro value, and the corrected magnetic field value. In this example, the estimating of the position of the terminal may further include calculating the travel distance of the terminal based on the acceleration value, and estimating the position of the terminal based on the magnetic field map, the magnetic field value, the direction information weight, and the travel distance. The examples described in the foregoing with reference to FIGS. 1 through 4 may be applicable to modules of FIG. 5, and thus, detailed descriptions thereof will be omitted.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments to accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile terminal for a magnetic field map-based positioning system, comprising:
   a memory configured to store a magnetic field map comprising magnetic field values at positions;
   a magnetic field sensor configured to measure a magnetic field value at a position of the mobile terminal;
   an inertial measurement unit (IMU) sensor configured to measure an acceleration value and a gyro value of the mobile terminal; and
   a processor comprising:
      a magnetic field value corrector configured to correct the measured magnetic field value based on the acceleration value and the gyro value, and
      a first position estimator configured to determine the position of the mobile terminal based on the magnetic field map and the corrected magnetic field value.

2. The mobile terminal of claim 1, wherein the gyro value comprises a rotation value and an orientation value of the mobile terminal.

3. The mobile terminal of claim 1, wherein the magnetic field value corrector comprises:
   a tilt error calculator configured to determine a tilt error of the mobile terminal based on the acceleration value and the gyro value; and
   a magnetic field value correction implementer configured to correct the measured magnetic field value based on the tilt error.

4. The mobile terminal of claim 3, wherein the tilt error comprises a pitch, a roll, and a yaw of the mobile terminal.

5. The mobile terminal of claim 1, wherein the processor comprises:
   a first direction information generator configured to generate first direction information based on the measured magnetic field value and the acceleration value;
   a second direction information generator configured to generate second direction information based on the acceleration value and the gyro value; and
   a direction information weight setting unit configured to set a direction information weight based on the first direction information and the second direction information.

6. The mobile terminal of claim 5, wherein the direction information weight setting unit is further configured to:
   subtract a variance of the second direction information from a variance of the first direction information to determine a first value;
   set the direction information weight to the second direction information if the first value is greater than a predetermined threshold value;
   subtract the variance of the first direction information from the variance of the second direction information to determine a second value; and
   set the direction information weight to the first direction information if the second value is greater than the predetermined threshold value.

7. The mobile terminal of claim 5, wherein the processor further comprises:
   a travel distance calculator configured to determine a travel distance of the mobile terminal based on the acceleration value; and
   a second position estimator configured to determine the position of the mobile terminal based on the magnetic field map, the measured magnetic field value, the direction information weight, and the travel distance.

8. The mobile terminal of claim 1, wherein the processor comprises:
   a direction information generator configured to set direction information weight of the mobile terminal based on the corrected magnetic field value, the acceleration value, and the gyro value;
   a travel distance calculator configured to determine a travel distance of the mobile terminal based on the acceleration value; and a third position estimator configured to determine the position of the mobile terminal based on the magnetic field map, the corrected magnetic field value, the direction information weight, and the travel distance.

9. The mobile terminal of claim 1, wherein the processor is further configured to determine the position of the mobile terminal based on a particle filter, or a Kalman filter, or Markov localization, or any combination thereof.

10. A positioning method for a magnetic field map-based positioning system, comprising:
   determining a magnetic field map comprising magnetic field values at positions;
   measuring a magnetic field value at a position of a mobile terminal;
   measuring an acceleration value and a gyro value of the mobile terminal;
   correcting the measured magnetic field value based on the acceleration value and the gyro value; and
   determining the position of the mobile terminal based on the magnetic field map and the corrected magnetic field value.

11. The method of claim 10, wherein the gyro value comprises a rotation value and an orientation value of the mobile terminal.

12. The method of claim 10, wherein correcting the magnetic field value comprises:
   determining a tilt error of the mobile terminal based on the acceleration value and the gyro value; and
   correcting the measured magnetic field value based on the tilt error.

13. The method of claim 12, wherein the tilt error comprises a pitch, a roll, and a yaw of the mobile terminal.

14. The method of claim 10, wherein the determining of the position of the mobile terminal comprises:
   generating first direction information based on the measured magnetic field value and the acceleration value;
   generating second direction information based on the acceleration value and the gyro value; and
   setting a direction information weight based on the first direction information and the second direction information.

15. The method of claim 14, wherein setting the direction information weight comprises:
   subtracting a variance of the second direction information from a variance of the first direction information to determine a first value;
   setting the direction information weight to the second direction information if the first value is greater than a predetermined threshold value;
   subtracting the variance of the first direction information from the variance of the second direction information to determine a second value; and
   setting the direction information weight to the first direction information if the second value is greater than the predetermined threshold value.

16. The method of claim 14, wherein the determining of the position of the mobile terminal further comprises:
   determining a travel distance of the mobile terminal based on the acceleration value; and
   determining the position of the mobile terminal based on the magnetic field map, the measured magnetic field value, the direction information weight, and the travel distance.

17. The method of claim 10, wherein the determining of the position of the mobile terminal comprises:
   setting direction information weight of the mobile terminal based on the corrected magnetic field value, the acceleration value, and the gyro value;
   determining a travel distance of the mobile terminal based on the acceleration value; and
   determining the position of the mobile terminal based on the magnetic field map, the corrected magnetic field value, the direction information weight, and the travel distance.

18. A non-transitory computer-readable storage medium storing a program comprising instructions to implement the method of claim 10.

* * * * *